(12) United States Patent
Grabowski et al.

(10) Patent No.: US 8,314,809 B1
(45) Date of Patent: Nov. 20, 2012

(54) SELECTIVE RENDERING OF OFF-SCREEN CONTENT

(75) Inventors: John Ralph Grabowski, Pacifica, CA (US); Grace Hua Kloba, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,667

(22) Filed: Sep. 26, 2011

Related U.S. Application Data

(63) Continuation of application No. 13/223,272, filed on Aug. 31, 2011.

(51) Int. Cl.
*G09G 5/399* (2006.01)
*G09G 5/36* (2006.01)

(52) U.S. Cl. .......................... 345/548; 345/539; 345/545

(58) Field of Classification Search .................. 345/539, 345/545, 548
See application file for complete search history.

(56) References Cited

U.S. PATENT DOCUMENTS

| | | | |
|---|---|---|---|
| 2004/0217980 | A1 | 11/2004 | Radburn et al. |
| 2007/0229524 | A1* | 10/2007 | Hendrey et al. ............... 345/552 |
| 2010/0281402 | A1 | 11/2010 | Staikos et al. |

OTHER PUBLICATIONS

"Adobe Reader 8 user guide", Adobe Systems Incorporated, 2007, retrieved from <http://help.adobe.com/en_US/Reader/8.0/help.pdf>.
"Offscreen Rendering", Chromium Embedded Framework Forum, retrieved from <http://magpcss.org/ceforum/viewtopic.php?f=6&t=261>, Mar. 25, 2011.
"Force Full Page Rendering on Mobile Safari?", Stack Overflow, retrieved from <http://stackoverflow.com/questions/4249392/force-full-page-rendering-on-mobile-safari>, Nov. 22, 2010.

* cited by examiner

*Primary Examiner* — Hau Nguyen
(74) *Attorney, Agent, or Firm* — McDermott Will & Emery LLP

(57) ABSTRACT

Computer-implemented methods for selectively pre-rendering off-screen content for display before the content comes on-screen on a device are provided. In one aspect, a method includes receiving a request to display content on a device and dividing the content into a first displayable portion that is based on a size of a viewport of the device and a second displayable portion that is outside the viewport. The method also includes rendering and displaying the first displayable portion of content within the viewport, and selecting a subset of the second displayable portion of content for rendering off-screen based on a predetermined rule. Systems, graphical user interfaces, and machine-readable media are also provided.

23 Claims, 5 Drawing Sheets

… (US 8,314,809 B1)

SELECTIVE RENDERING OF OFF-SCREEN CONTENT

CROSS-REFERENCE TO RELATED APPLICATIONS

The present application is a continuation of and claims the benefit of priority under 35 U.S.C. §120 from U.S. patent application Ser. No. 13/223,272 entitled "Selective Rendering of Off-Screen Content," filed on Aug. 31, 2011, the disclosure of which is hereby incorporated by reference in its entirety for all purposes.

BACKGROUND

1. Field

The present disclosure generally relates to the transmission of data over a network, and more particularly to the use of a computing device to view data communicated over a network.

2. Description of the Related Art

Mobile devices are particularly constrained by display size. As a result, web browsers for mobile devices often display only a portion of a web page within their limited device screen space ("viewport"). The dimensions of the viewport are determined based on the web browser's determination of screen space (e.g., pixels) available to display the web page. A user must scroll to read content for the web page that is not displayed within the viewport.

Two approaches are commonly taken to rendering content outside the viewport: (1) content outside of the viewport is rendered when it comes within the viewport, or (2) all web page content, including content outside of the viewport, is rendered immediately when the web page is loaded by the web browser. Each approach has its drawbacks. If the content outside the viewport is rendered when it comes within the viewport, there may be a delay in rendering the content outside the viewport for display within the viewport, and as a result the user may see a blank screen or a part of a blank screen. If all of the content outside the viewport is rendered when the web page is loaded, it may cause unnecessary delay and result in inefficient use of battery power, processing capacity, and memory, especially if the user does not view the content outside viewport.

SUMMARY

According to one embodiment of the disclosure, a computer-implemented method for selectively pre-rendering off-screen content for display before the content comes on-screen on a device is provided. The method includes receiving a request to display content on a device and dividing the content into a first displayable portion that is based on a size of a viewport of the device and a second displayable portion that is outside the viewport. The method also includes rendering and displaying the first displayable portion of content within the viewport, and selecting a subset of the second displayable portion of content for rendering off-screen based on a predetermined rule.

According to another embodiment of the disclosure, a system for selectively pre-rendering off-screen content for display before the content comes on-screen on a device is provided. The system includes a memory comprising content for display, and a processor. The processor is configured to receive a request to display content on a device and divide the content into a first displayable portion that is based on a size of a viewport of the device and a second displayable portion that is outside the viewport. The processor is also configured to render and display the first displayable portion of content within the viewport, and select a subset of the second displayable portion of content for rendering off-screen based on a predetermined rule, wherein the predetermined rule is based on at least one of the content, a viewing history of a user, and a proximity of the subset of the second displayable portion to the viewport.

According to a further embodiment of the disclosure, a web browser that selectively pre-renders off-screen content for display before the content comes on-screen on a device is provided. The web browser includes a display area, based on the size of a viewport of the device, configured to display content on the device. The content is divided into a first displayable portion that is based on a size of the display area and a second displayable portion that is outside the display area. The first displayable portion of content is rendered and displayed within the display area, and a subset of the second displayable portion of content for rendering off-screen is selected based on a predetermined rule. The predetermined rule is based on at least one of the content, a viewing history of a user, and a proximity of the subset of the second displayable portion to the viewport. The first displayable portion and the second displayable portion are each divided into equally sized tiles.

According to yet a further embodiment of the disclosure, a machine-readable storage medium comprising machine-readable instructions for causing a processor to execute a method for selectively pre-rendering off-screen content for display before the content comes on-screen on a device is provided. The method includes receiving a request to display content on a device, dividing the content into equally sized tiles, and rendering and displaying tiles located within a viewport of the device. The method also includes selecting a subset of the remaining tiles for rendering off-screen based on at least one of the content of a tile, a viewing history of a user, and a proximity of the tile to the viewport.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system divides a web page into tiles, and selectively renders tiles outside a device's viewport ("pre-rendering") based on a likelihood that a user will later scroll left right, up, or down to view those tiles within the viewport. The tiles outside the viewport can be selected and prioritized for pre-rendering based on their proximity to the viewport, the user's past scrolling history, and the content of the web page. As a result, display latency of the web page content is reduced. If the user scrolls the viewport into an area containing tiles that have not been pre-rendered, then these tiles are rendered at that point in time.

For instance, tiles below the viewport are pre-rendered before tiles above the viewport, and tiles to the right of the viewport are pre-rendered before tiles outside to the left of the viewport. Tiles that are closer to the viewport are pre-rendered before tiles that are farther away from the viewport. Tiles vertically outside (e.g., above or below) the viewport are pre-rendered before tiles horizontally outside (e.g., to the right or left) the viewport, because, for example, a user is more likely to browse downward than to the side. Tiles that are diagonally outside the viewport may be rendered last.

As another example, if the user has been scrolling downwards to view content below the viewport, tiles below the viewport are pre-rendered before tiles above the viewport. If the user is reading a script that reads from right to left, such as Arabic, then content to the left of the viewport is pre-rendered before content to the right of the viewport.

While many examples are provided herein in the context of a web page, the principles of the present disclosure contemplate other types of displayable content as well. For example, word processing, mobile applications, graphic editing software, maps, and any other form of visual rendering are all considered within the scope of the present disclosure.

Figure 1:
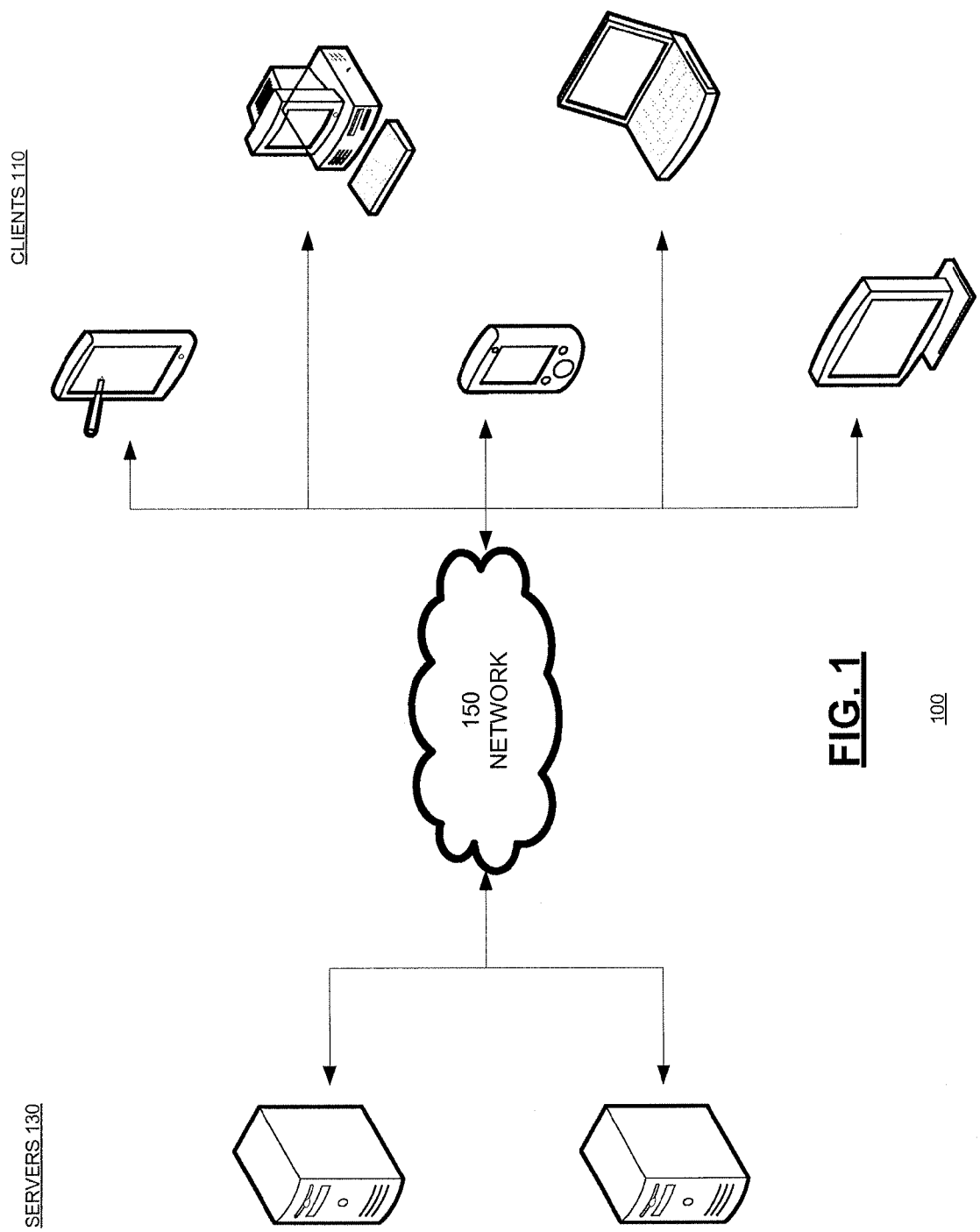
FIG. 1 illustrates an exemplary architecture for selectively pre-rendering off-screen content for display before the content comes on-screen on a device.

Turning to the drawings, FIG. 1 illustrates an exemplary architecture 100 for selectively pre-rendering off-screen content for display before the content comes on-screen on a device. The architecture 100 includes servers 130 and clients 110 connected over a network 150.

Each of the clients 130 is configured to download, install, and run a web browser as disclosed herein. The web browser is configured to run on clients 130 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the web browser, such as increased web page display time in response to a scroll, are most salient on clients 110 that are mobile devices or that otherwise have slower processing speeds.

The web browser can be downloaded over the network 150 from one of the many servers 130. For purposes of load balancing, multiple servers 130 can also host the data for downloading the web browser. In certain instances, different versions and/or configurations of the web browser that include the features disclosed herein are available for download from a server 130 and subsequent installation depending on whether the client 130 is a mobile device or non-mobile device. The web browser, once installed on a client 130, is configured to load web pages from any one or multiple client servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 130, is configured to display a downloaded web page in a web browser. The web page is divided by the web browser into equally sized tiles organized by whether those tiles appear within the viewport of the client 130 or outside of the viewport of the client 130 (e.g., when the height or width of the web page at a certain zoom level exceeds the height or width of the viewport). Tiles of the web page within the viewport are rendered and displayed within the viewport for the user. On the other hand, a limited subset of the remaining tiles (e.g., the tiles outside the viewport) are selected for pre-rendering so that they are ready to be displayed if the user scrolls the web page to have them appear within the viewport. The subset of the remaining tiles designated for pre-rendering are selected based on, for example, the proximity of the tiles to the viewport, the user's past scrolling history (e.g., immediate past or over time), and the content of the web page (e.g., the text in the web page reads from right to left).

Figure 2:
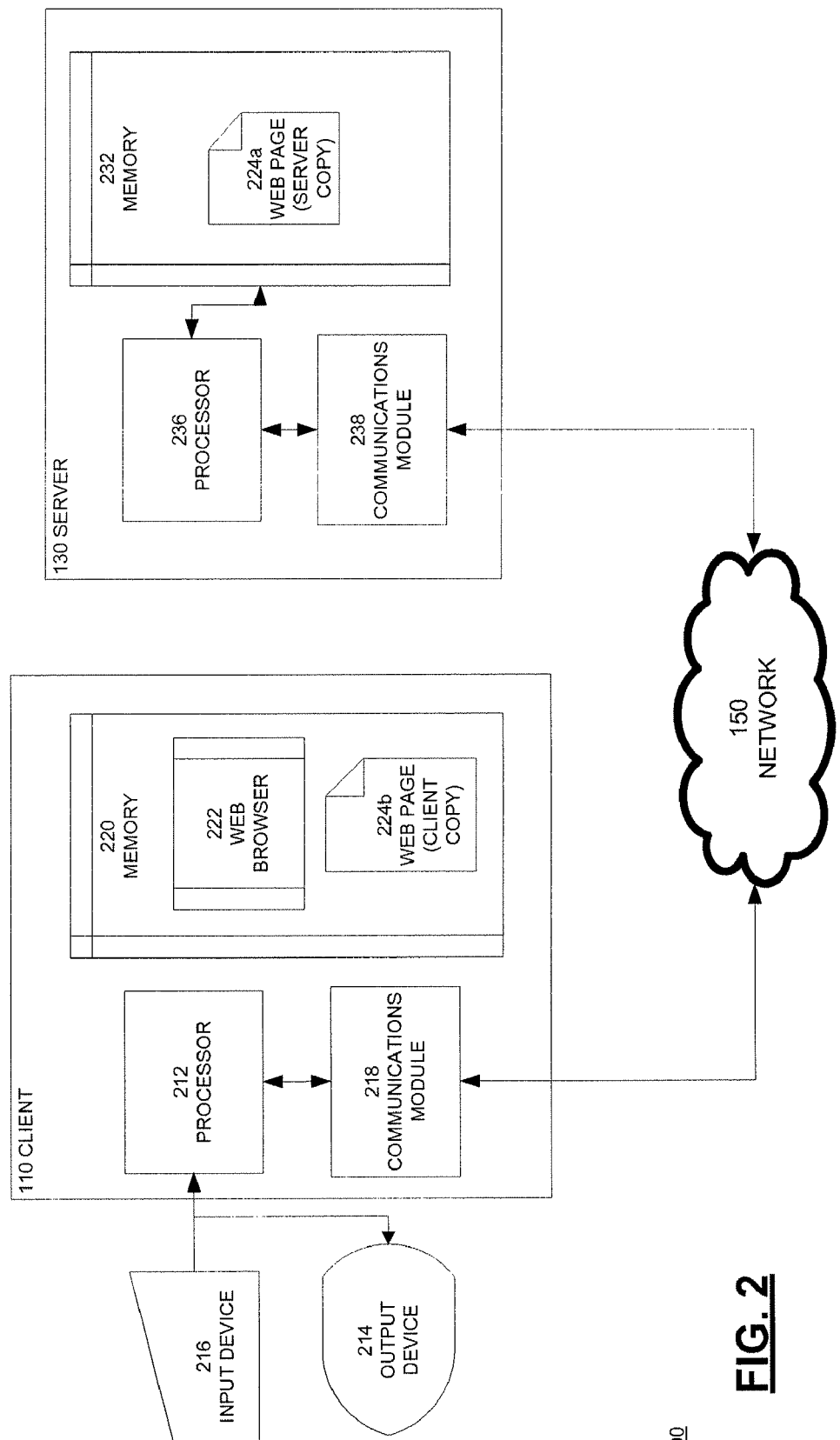
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes a web browser 222 and a client copy of a web page 224b (or other displayable content) to display in the web browser 222 using the output device 214 (e.g., a display) of the client 110. The client copy of the web page 224b is received from the server 130 over the network 150 using respective communications modules 218 and 238 of the client 110 and server 130. Specifically, the server 130 provides a copy of a web page 224a in memory 232 to the client 110 in response to a request from the client 110. The client 110 also includes an input device 216, such as a keyboard, touchscreen, or mouse, to receive user scroll/viewing inputs.

The processor 212 of the client 110 is configured to execute instructions, such as instructions physically coded into the processor 212, instructions received from software in memory 240, or a combination of both. For example, the processor 212 of the client 110 executes instructions from the web browser 222 to receive a request to display content, such as the web page 224b, and divide the content into a first displayable portion that is based on a size of a viewport of the client 110 and a second displayable portion that is outside the viewport. The displayable portions can each be divided into equally sized tiles of arbitrary length. For example, if the viewport of the device is 480 pixels by 800 pixels, then the first displayable portion (e.g., the portion within the viewport)

can be divided into a two by three row of tiles, with each tile being 240 pixels in width and 267 pixels in height. The processor 212 renders (e.g., prepares for display) and displays the first displayable portion of the web page 224b within the viewport.

The processor 212 is also configured to select a subset of the second displayable portion of the web page 224b, i.e., the displayable portion of the web page 224b that is outside the viewport, for rendering off-screen based on a predetermined rule, and render off-screen the selected subset of the second displayable portion of content. The predetermined rule can include one or many constraints for determining which off-screen tiles to select for pre-rendering and the order in which the selected off-screen tiles will be pre-rendered. The predetermined rule can be based on the content of the web page 224b, a viewing history of a user, and/or a proximity of the subset of the second displayable portion to the viewport.

A list of exemplary constraints for the predetermined rule will now be provided. The processor 212 can, for example, select a tile located off-screen below the viewport for rendering off-screen before selecting a tile located off-screen above the viewport for rendering off-screen, and select a tile located off-screen to the right of the viewport for rendering off-screen before selecting a tile located off-screen to the left of the viewport for rendering off-screen. This is advantageous because a user tends to scroll to the right and downwards to view additional content due to the nature of the direction of content (e.g., English text reads from left to right, and a new line of English text proceeds from below a current line of text), thus it is more likely that a user will scroll the web page 224b right rather than left, and down rather than up. In certain aspects, the processor 212 can thus selecting a tile located off-screen in the reading direction of the content for rendering off-screen before a tile located off-screen in the direction opposite of the reading direction of the content.

The processor 212 can also select a first tile located off-screen for rendering off-screen that is closer to the viewport before selecting a second tile located off-screen for rendering off-screen that is farther from the viewport than the first tile. This is advantageous because a user tends to scroll off screen to content that is closer off screen to the content the user is viewing that content that is farther away from the content the user is viewing. Similarly, the processor 212 can select a tile located off-screen in the direction of the last scrolling input by the user for rendering off-screen before a tile located off-screen in the direction opposite of the direction of the last scrolling input by the user. This is advantageous because a user tends to continue scrolling in a single direction when viewing content. The processor 212 can also predict the scrolling velocity of the user to determine the predicted scrolling target of a user's next scroll, and render tiles associated with the target content accordingly. For example, if a user has been scrolling very rapidly to target content substantially far away from the viewport, then the processor 212 can predict the next target content substantially far away from the viewport and render tiles for that content off-screen in advance.

The number of tiles that are pre-rendered can be limited based on the amount of memory, processing capacity, and battery power available to the client 110. For example, if the memory limit allows a total of six tiles to be rendered off-screen, than four tiles below the viewport and two tiles above the viewport can be selected for rendering off-screen. Similarly, if the memory limit, processing capacity, and battery power allow a large number of tiles to be rendered off-screen, then two or more tiles outside of the viewport in any direction (e.g., above, below, to the left, to the right, and in diagonal directions) can be rendered off-screen.

Figure 3:
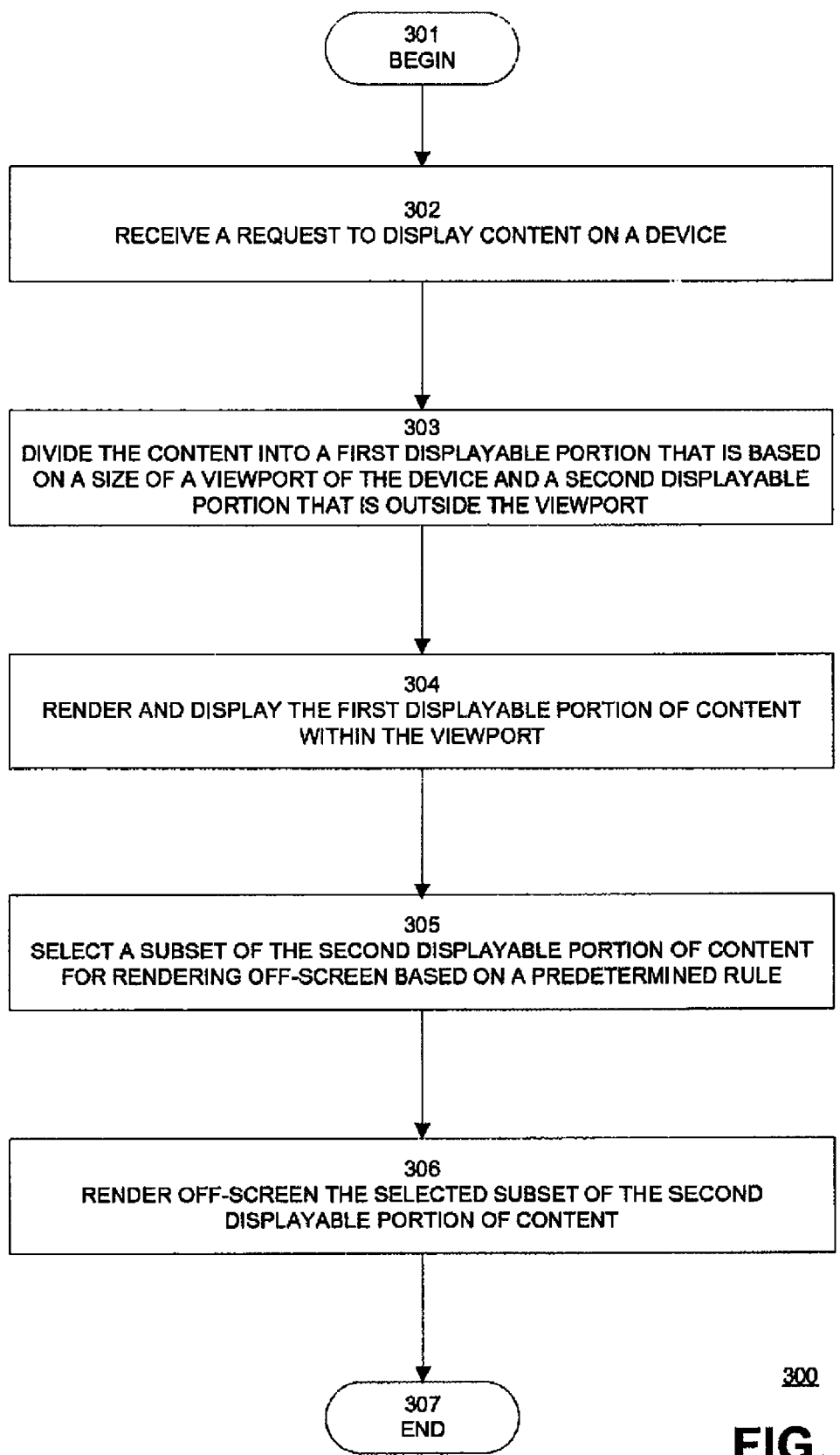
FIG. 3 illustrates an exemplary process for selectively pre-rendering off-screen content for display before the content comes on-screen using an exemplary client of FIG. 2.

FIG. 3 illustrates an exemplary process 300 using the exemplary client 110 of FIG. 2 for selectively pre-rendering off-screen content for display before the content comes on-screen. The process 300 begins by proceeding from step 301 when a user loads an application, such as a web browser 222 on the client 110, which has content, such as a downloaded web page 224b, available for display. In step 302, a request to display the content on the client 110 is received. In step 303, the content is divided into a first displayable portion that is based on a size of a viewport of the device, and a second displayable portion that is outside the viewport. The first displayable portion of content is rendered and displayed within the viewport in step 304, and in step 305 a subset of the second displayable portion of content is selected for rendering off-screen based on a predetermined rule. Finally, in step 306, the selected subset of the second displayable portion of content is rendered off-screen, and the process 300 ends in step 307.

FIG. 3 set forth an exemplary process 300 for selectively pre-rendering off-screen content for display before the content comes on-screen using the exemplary client 110 of FIG. 2. An example will now be described using the exemplary process 300 of FIG. 3, a smartphone client 110 having a small viewport, a mobile web browser 222, and client copy of a web page 224b.

Figure 4:
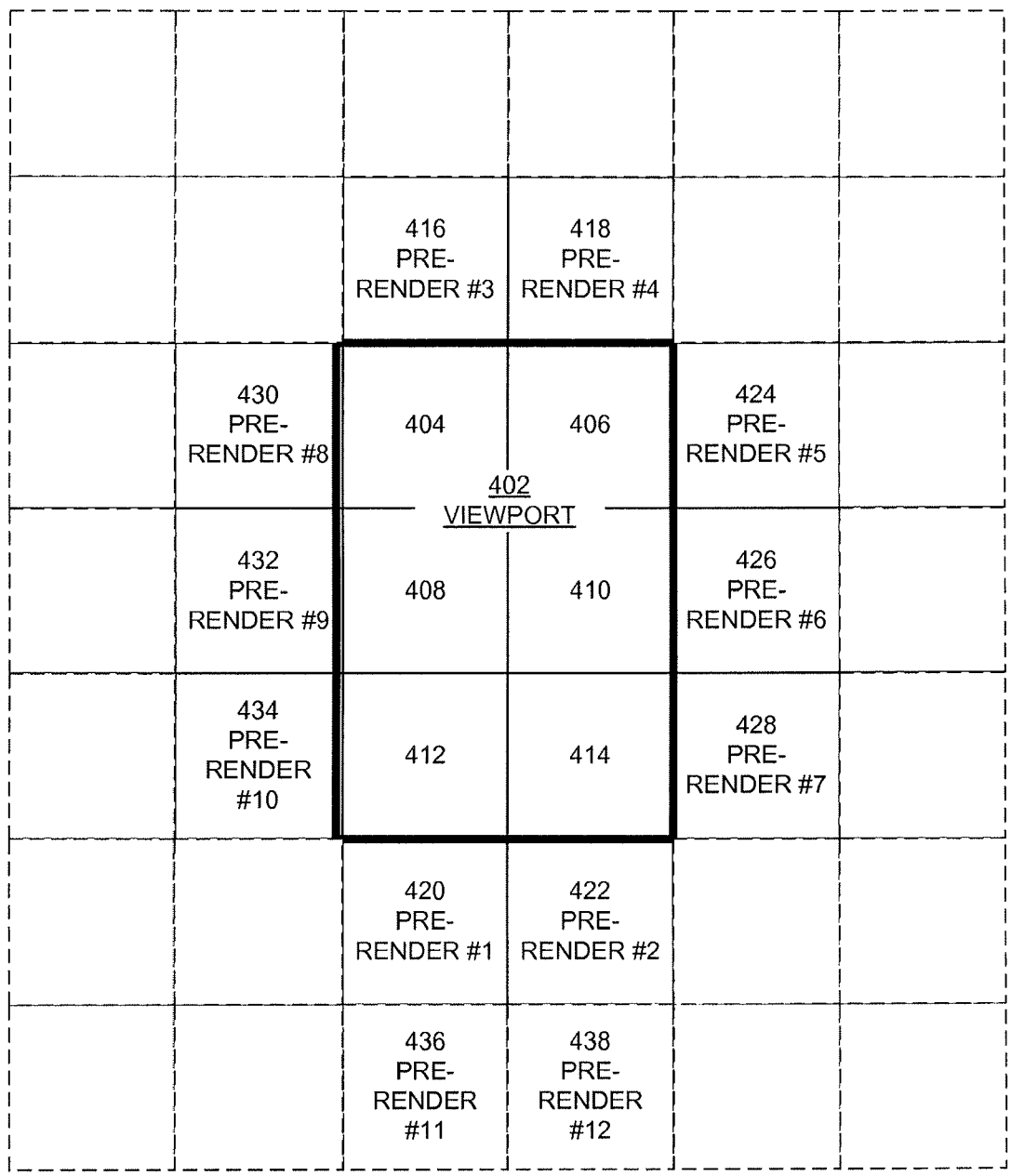
FIG. 4 is an exemplary illustration, associated with the exemplary process of FIG. 3, in which displayable content is divided into a first portion displayed within a viewport and a second portion outside the viewport that has a subset selectively pre-rendered off-screen.

The process 300 begins by proceeding from step 301 when a user loads a mobile web browser 222 on the user's smartphone 110. The mobile web browser 222 has downloaded a web page 224b that the user wishes to view. In step 302, the user requests to display the web page 224b in the mobile web browser 222. In step 303, the mobile web browser 222 divides the web page 224b into a first displayable portion that is based on a size of a viewport of the smartphone 110, and a second displayable portion that is outside the viewport of the smartphone 110. Specifically, each of the first and second displayable portions is divided into equally sized tiles, as illustrated in FIG. 4, an exemplary illustration of the web page 224b. The tiles from the first displayable portion of content, namely tiles 404, 406, 408, 410, 412, and 414 are rendered and displayed within the viewport 402 in step 304.

In step 305, a subset of the second displayable portion of content is selected according to the following constraints. Tiles of the web page 224b located off-screen below the viewport 402, namely tiles 420 and 422, are selected for rendering off-screen before tiles located off-screen above the viewport 402, namely tiles 416 and 418, are selected for rendering off-screen. Next, tiles located off-screen to the right of the viewport 402, namely tiles 424, 426, and 428, are selected for rendering off-screen before tiles located off-screen to the left of the viewport 402, namely 430, 432, and 434, are selected for rendering off-screen. Because there is sufficient memory, processing capacity, and battery power remaining for the rendering of additional tiles off screen, additional tiles below the viewport 402, namely tiles 436 and 438, are selected for rendering off-screen. Finally, in step 306, the selected subset of tiles, namely tiles 416 to 438, is rendered off-screen, and the process 300 ends in step 307.

Figure 5:
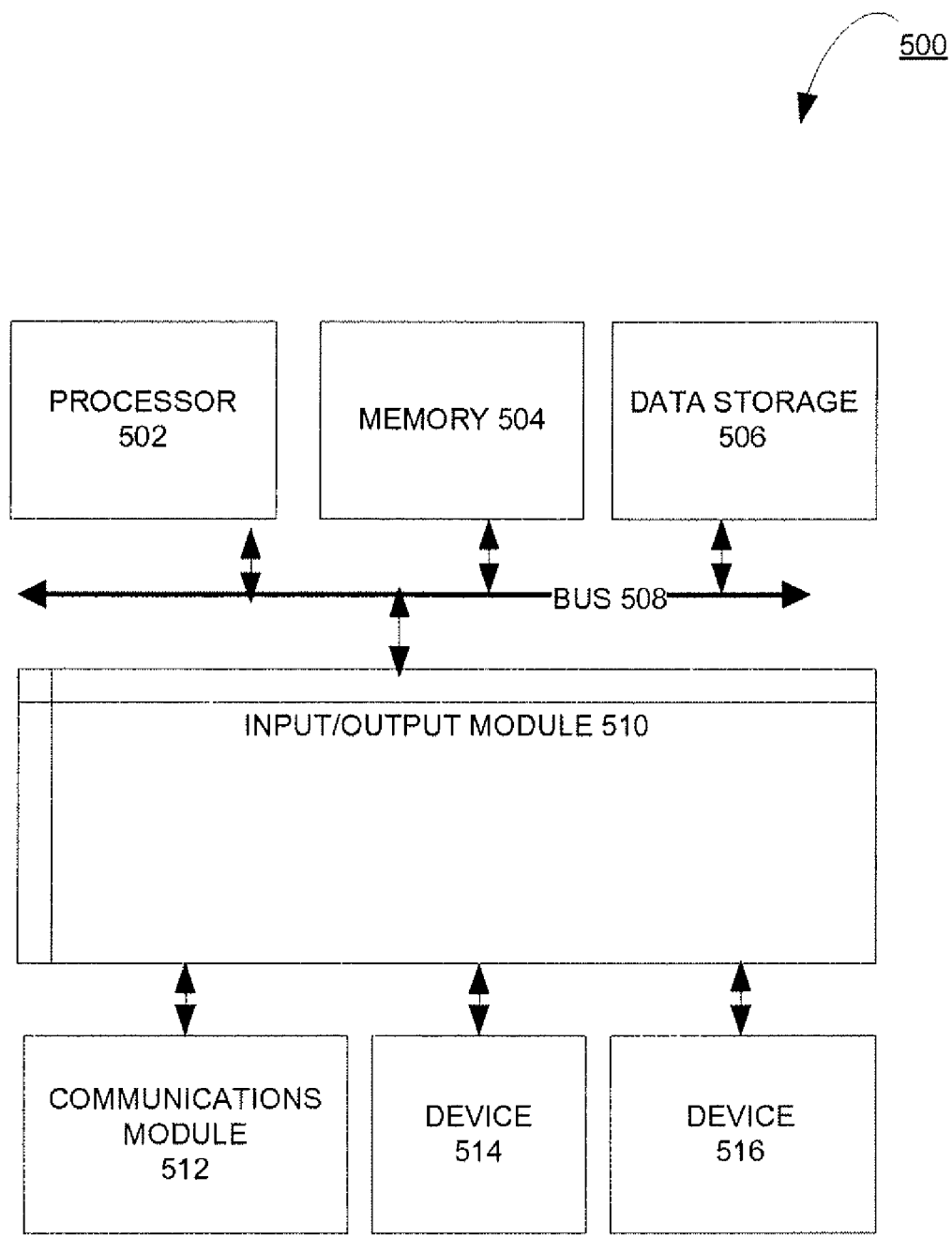
FIG. 5 is a block diagram illustrating an exemplary computer system with which the client of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, applications, and machine-readable storage media for selectively pre-rendering off-screen content for display before the content comes on-screen on a device have been described. An application obtains content to display on a device. The space required to display the entire content, however, exceeds the space provided by the viewport of the device. The application pre-renders a subset of the content that appears off-screen in advance of that content appearing on screen in order to save loading time for the user. The subset of the content is selected for pre-rendering based on certain constraints, such as what the content is, the proximity of the subset of the off-screen content to the viewport, and the user's viewing history.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for selectively pre-rendering off-screen content for display before the content comes on-screen on a device, the method comprising:
   receiving a request to display content on a device;
   dividing the content into a first displayable portion that is based on a size of a viewport of the device and a second displayable portion that is outside the viewport;
   rendering and displaying the first displayable portion of content within the viewport; and
   selecting a subset of the second displayable portion of content for pre-rendering off-screen based on a predetermined rule so that the subset is ready for display when on-screen,
   wherein the predetermined rule is based on at least one of a reading direction of the content and a viewing history of a user.

2. The computer-implemented method of claim 1, further comprising rendering off-screen the selected subset of the second displayable portion of content.

3. The computer-implemented method of claim 1, wherein the predetermined rule is further based on a proximity of the subset of the second displayable portion to the viewport.

4. The computer-implemented method of claim 3, wherein the first displayable portion and the second displayable portion are each divided into equally sized tiles.

5. The computer-implemented method of claim 4, wherein the predetermined rule comprises selecting a tile located off-screen below the viewport for pre-rendering off-screen before selecting a tile located off-screen above the viewport for pre-rendering off-screen.

6. The computer-implemented method of claim 4, wherein the predetermined rule comprises selecting a tile located off-screen to the right of the viewport for pre-rendering off-screen before selecting a tile located off-screen to the left of the viewport for pre-rendering off-screen.

7. The computer-implemented method of claim 4, wherein the predetermined rule comprises selecting a first tile located off-screen for pre-rendering off-screen that is closer to the viewport before selecting a second tile located off-screen for pre-rendering off-screen that is farther from the viewport than the first tile.

8. The computer-implemented method of claim 4, wherein the predetermined rule being based on the reading direction of the content comprises selecting a tile located off-screen in the reading direction of the content for pre-rendering off-screen before a tile located off-screen in the direction opposite of the reading direction of the content.

9. The computer-implemented method of claim 4, wherein the predetermined rule being based on the viewing history of the user comprises selecting a tile located off-screen in the direction of the last scrolling input by the user for pre-rendering off-screen before a tile located off-screen in the direction opposite of the direction of the last scrolling input by the user.

10. A system for selectively pre-rendering off-screen content for display before the content comes on-screen on a device, the system comprising:
    a memory comprising content for display;
    a processor configured to:
        receive a request to display content on a device;
        divide the content into a first displayable portion that is based on a size of a viewport of the device and a second displayable portion that is outside the viewport;
        render and display the first displayable portion of content within the viewport; and
        select a subset of the second displayable portion of content for pre-rendering off-screen based on a predetermined rule so that the subset is ready for display when on-screen, wherein the predetermined rule is based on at least one of a reading direction of the content and a viewing history of a user.

11. The system of claim 10, wherein the processor is further configured to render off-screen the selected subset of the second displayable portion of content.

12. The system of claim 10, wherein the predetermined rule is further based on a proximity of the subset of the second displayable portion to the viewport, and wherein the processor is configured to divide first displayable portion and the second displayable portion into equally sized tiles.

13. The system of claim 12, wherein the predetermined rule comprises the processor selecting a tile located off-screen below the viewport for pre-rendering off-screen before selecting a tile located off-screen above the viewport for pre-rendering off-screen.

14. The system of claim 12, wherein the predetermined rule comprises the processor selecting a tile located off-screen to the right of the viewport for pre-rendering off-screen before selecting a tile located off-screen to the left of the viewport for pre-rendering off-screen.

15. The system of claim 12, wherein the predetermined rule comprises the processor selecting a first tile located off-screen for pre-rendering off-screen that is closer to the viewport before selecting a second tile located off-screen for pre-rendering off-screen that is farther from the viewport than the first tile.

16. The system of claim 12, wherein the predetermined rule being based on the reading direction of the content comprises the processor selecting a tile located off-screen in the reading direction of the content for pre-rendering off-screen before a tile located off-screen in the direction opposite of the reading direction of the content.

17. The system of claim 12, wherein the predetermined rule being based on the viewing history of the user comprises the processor selecting a tile located off-screen in the direction of the last scrolling input by the user for pre-rendering off-screen before a tile located off-screen in the direction opposite of the direction of the last scrolling input by the user.

18. A web browser that selectively pre-renders off-screen content for display before the content comes on-screen on a device, the web browser comprising:
    a display area, based on the size of a viewport of the device, configured to display content on the device,
    wherein the content is divided into a first displayable portion that is based on a size of the display area and a second displayable portion that is outside the display area, the first displayable portion and the second displayable portion each divided into equally sized tiles,
    wherein the first displayable portion of content is rendered and displayed within the display area, and
    wherein a subset of the second displayable portion of content for pre-rendering off-screen is selected based on a predetermined rule so that the subset is ready for display when on-screen, the predetermined rule based on at least one of a reading direction of the content and a viewing history of a user.

19. The web browser of claim 18, wherein the selected subset of the second displayable portion of content is rendered off-screen.

20. The web browser of claim 18, wherein the predetermined rule is further based on a proximity of the subset of the second displayable portion to the viewport, the predetermined rule comprising:
    selecting a tile located off-screen below the viewport for pre-rendering off-screen before selecting a tile located off-screen above the viewport for pre-rendering off-screen;
    selecting a tile located off-screen to the right of the viewport for pre-rendering off-screen before selecting a tile located off-screen to the left of the viewport for pre-rendering off-screen; and
    selecting a first tile located off-screen for pre-rendering off-screen that is closer to the viewport before selecting a second tile located off-screen for pre-rendering off-screen that is farther from the viewport than the first tile.

21. The web browser of claim 18, wherein the predetermined rule being based on the reading direction of the content comprises selecting a tile located off-screen in the reading direction of the content for pre-rendering off-screen before a tile located off-screen in the direction opposite of the reading direction of the content.

22. The web browser of claim 18, wherein the predetermined rule being based on the viewing history of the user comprises selecting a tile located off-screen in the direction of the last scrolling input by the user for pre-rendering off-screen before a tile located off-screen in the direction opposite of the direction of the last scrolling input by the user.

23. A machine-readable storage medium comprising machine-readable instructions for causing a processor to execute a method for selectively pre-rendering off-screen content for display before the content comes on-screen on a device, the method comprising:
    receiving a request to display content on a device;
    dividing the content into equally sized tiles; and
    rendering and displaying tiles located within a viewport of the device;
    selecting a subset of the remaining tiles for pre-rendering off-screen so that the subset is ready for display when on-screen based on at least one of a reading direction of the content of a tile and a viewing history of a user.

* * * * *